United States Patent
Brunswig et al.

(10) Patent No.: US 7,698,174 B2
(45) Date of Patent: Apr. 13, 2010

(54) WIKI BIZ WEB

(75) Inventors: Frank Brunswig, Heidelberg (DE);
Thomas Fiedler, Pfinztal (DE);
Wolfgang Pfeifer, Kerzenheim (DE);
Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 10 days.

(21) Appl. No.: 11/900,839

(22) Filed: Sep. 12, 2007

(65) Prior Publication Data

US 2009/0070233 A1 Mar. 12, 2009

(51) Int. Cl.
*G06F 17/60* (2006.01)

(52) U.S. Cl. .............................. 705/27; 705/26; 705/28; 705/1

(58) Field of Classification Search ................... 705/26, 705/27, 28, 1
See application file for complete search history.

(56) References Cited

U.S. PATENT DOCUMENTS

| | | | | |
|---|---|---|---|---|
| 5,895,454 | A * | 4/1999 | Harrington | 705/26 |
| 5,913,210 | A * | 6/1999 | Call | 707/4 |
| 5,960,402 | A * | 9/1999 | Embutsu et al. | 705/1 |
| 5,965,858 | A * | 10/1999 | Suzuki et al. | 235/375 |
| 6,954,736 | B2 * | 10/2005 | Menninger et al. | 705/28 |
| 7,162,440 | B2 * | 1/2007 | Koons | 705/26 |
| 7,197,475 | B1 * | 3/2007 | Lorenzen et al. | 705/26 |
| 7,302,429 | B1 * | 11/2007 | Wanker | 707/7 |
| 7,363,249 | B1 * | 4/2008 | Boesjes | 705/26 |
| 7,487,577 | B2 * | 2/2009 | Ishida et al. | 29/403.1 |
| 7,607,578 | B2 * | 10/2009 | Zimet | 235/384 |
| 2002/0019785 | A1 * | 2/2002 | Whitman | 705/28 |
| 2002/0046134 | A1 * | 4/2002 | Egashira et al. | 705/26 |
| 2002/0065735 | A1 * | 5/2002 | Hatakama et al. | 705/26 |
| 2003/0135432 | A1 * | 7/2003 | McIntyre et al. | 705/28 |

OTHER PUBLICATIONS

USA Today "Google gives PayPal a run for your money" dated Jul. 24, 2006.*

* cited by examiner

*Primary Examiner*—Jeffrey A Smith
*Assistant Examiner*—Courtney Stopp
(74) *Attorney, Agent, or Firm*—Kenyon & Kenyon LLP (57) ABSTRACT

Systems and methods for accessing multiple portals using a unique business language semantic are provided. Business information and services are provided to customers during, for example, a supply chain management process. An accessible business environment is provided which includes a common repository. The common repository has access to one or more business portals. One can search the product listing in the common repository using a browser, e.g., a web-based browser. In response to a search, one may be provided with a product list indicating some available business portals having the specific product and/or service. The common repository entries are described by a predetermined semantical description.

15 Claims, 8 Drawing Sheets

WIKI BIZ WEB

BACKGROUND

Business software applications and documents are stored in a multitude of databases and units. With the advent of the Internet, those business software applications and documents are now available to persons, but oftentimes unfindable given the different modes of storing, and different metadata collections of words. Such applications and documents might be useful for a multitude of reasons, if findable. Accordingly, there exists a need to provide a uniform mode of storing business applications and documents which is searchable via existing internet search engines, and accessible by multitudes of persons. Likewise, this uniform storing of business applications and documents needs to be updatable by a multitude of persons.

DETAILED DESCRIPTION OF EXAMPLE EMBODIMENTS

An embodiment of the present invention provides a "repository for everyone." An embodiment of the present invention provides a unique semantical describing process and repository by which business applications, processes, and documents may be stored, and then later searchable in an efficient and useful manner. This unique describing should be understandable by many and be easy to implement.

An embodiment of the present invention provides a repository which is updated over time by possibly multitudes of persons connected via a computing device associated with the server database(s) storing the repository. In embodiments, the computing device may be a computer, cellular telephone, personal digital assistant, or any device allowing connectivity to the repository and transmission of data.

An embodiment of the present invention provides a common representation of business semantics for collaborative business entities and business processes. A unique methodology and language is developed for business semantic which also may assist in building business entities and processes. As with any semantical methodology, such is more useful provided more than one entity is able to understand and implement it for a common purpose. Further, already available semantic standards such as those provided by the various patent offices for certain classifications of products and inventions may be leveraged by embodiments of the present invention, providing a shorter and more efficient ramp-up period for users of the repository.

In the various embodiments of the present invention, there may be a single repository or several repositories used to store the business applications, processes and documents. In the various embodiments of the present invention, there may be multiple search engines available via the Internet or proprietary engines which may search the repository/repositories to access the business information stored.

In an embodiment of the present invention, a context driven approach for context specific categorization of business content is provided. The business contexts already or which will be used with a certain level of frequency may be leveraged and included in the context specific categorization of business content. In an embodiment of the present invention, business content may be based on a common business semantic language, context categorized, provided by a central repository, and be a commodity usable by others. In further embodiments, the semantic language and context categorization is updatable and can be expanded by users. Accessibility by users to update the categorization schema may allow for a more precise and current description, and may provide a time-efficient manner in obtaining same.

In an embodiment of the present invention, the unique semantical describing may leverage already available semantical expressions. For example, when characterizing collaborative business processes, the UN/CEFACT Modeling Methodology (UMM) may be utilized. And, for example, when characterizing reusable business data, the Core Component Technical Specification (CCTS) may be utilized. In an embodiment of the present invention, a context driven approach may provide a multi-dimensional categorization of business content. Such business content may be, for example, industrial, regional, or process related. In an embodiment of the present invention, the context driven approach includes context driven creation of new business content, context driven enhancement/modification of business content, and context driven discovery of business content.

In an embodiment of the present invention, not only would more recent and updated matters be utilized, but also context categorized business semantic artifacts may be included in the repository. For example, this may include a versioning and history of business content, central documentation of business content, and an embedded layout for user interfaces and paper printings.

In an embodiment of the present invention, the context categorization may also be influenced by a semantic matching and validation based on Web-based dictionaries. The repository may also allow for discussion and governance forums for the harmonization of business content. In an embodiment of the present invention, semi-automated mapping of existing business content may be provided. For example, the semantics of each node are semi-automatically mapped against appropriately defined common business semantic language. Existing business content libraries may be mapped to provide additional resources. In other embodiments, no outside libraries are mapped to the repository and/or its existing business content or searching facilities.

In an embodiment of the present invention, a rating system and trend analysis of business content is maintained. This rating system may be automated or reviewed manually, depending upon the context for the rating. For example, an automatic log may be maintained to track the more used business content and how they are accessed.

Embodiments of the present invention may allow for a significant reduction of business data and process modeling efforts by a single company. Such reduction of efforts is due in part to the ease and availability of resources made available and searchable by the present invention. Embodiments of the present invention allow for dynamic flexibility within a supply chain for each involved party, e.g., buyer, supplier, end customer. Further, given the flexible enrichment of the supply chain by users, the supply chain is service of product/goods-oriented, not partner-oriented. Given the added resources made available by embodiments of the present invention, there may be a significant reduction of consulting and integration efforts. Embodiments of the present invention may allow for automatic enrichment knowledge on business data and process content by collaborative modeling processes. Embodiments of the present invention may allow for adjustments/modifications of requirements and models by multiple users because all are described according to the same language of the business semantic. Embodiments of the present invention may allow for deployment and delivery of services that considers user-specific requirements.

In an embodiment of the present invention, context relevant information is inputted for a business process, industry and country. In an embodiment of the present invention, the same elementary business object is based on the same business semantic information.

In an embodiment of the present invention, the access and submission of business matters is RSS (Really Simple Syndication) enabled. In an embodiment of the present invention, download of business content may be effected via standardized formats, e.g., XMI, XSD, so that the layout is common and efficiently service enabling.

Figure 1:
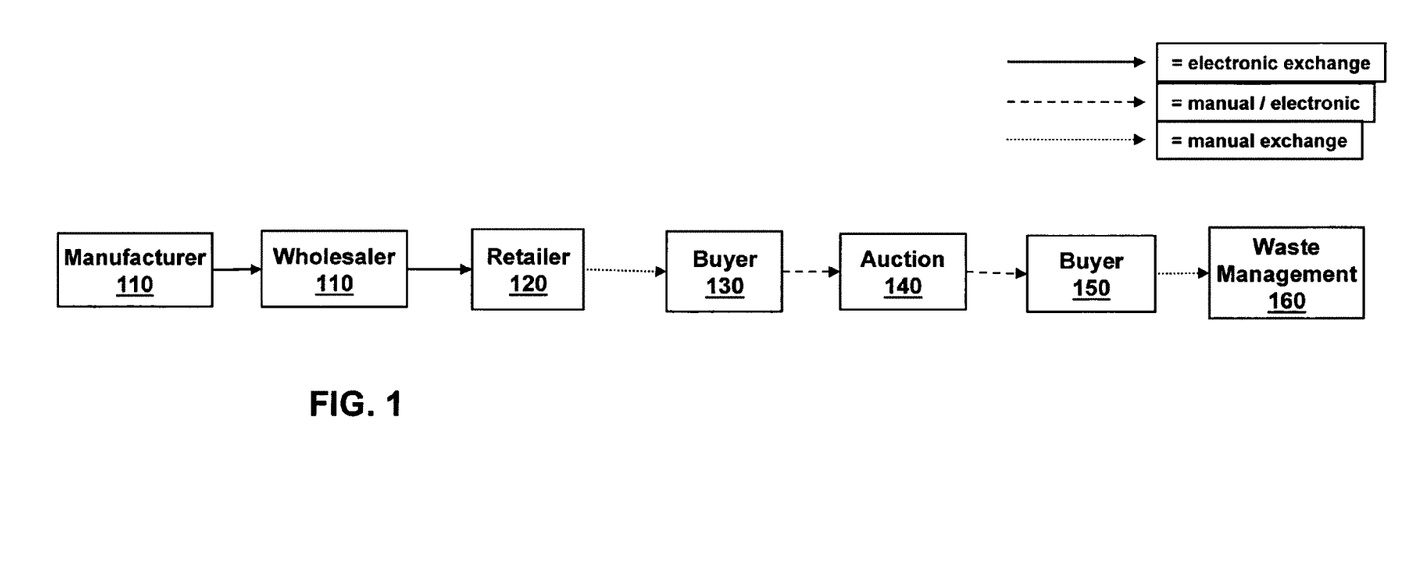
FIG. 1 shows an example supply chain management system.

FIG. 1 shows a static supply chain with a fixed partner. A manufacturer 100 is in contact with a wholesaler 110 to provide manufactured goods. The wholesaler 110 then supplies the goods to a retailer such as a bookstore 120. The retailer 120 then sells the goods to a buyer 130. The buyer 130 may later sell the same goods in an auction 140 to a second buyer 150. Eventually, it is expected that the goods are consumed and discarded as waste 160. In such a partner-oriented supply chain, the partners involved are limited and fixed. Further, it may be that small and flexible potential partners have no access to such a relationship because the supply chain process itself may be fixed and limiting. This supply chain process may be most useful if the manufacturer 100 is supplying a mass of goods to the wholesaler 110 and thus to the retailer 120 for an averaged profitable exchange. Such also may eliminate any small business providers.

Figure 2:
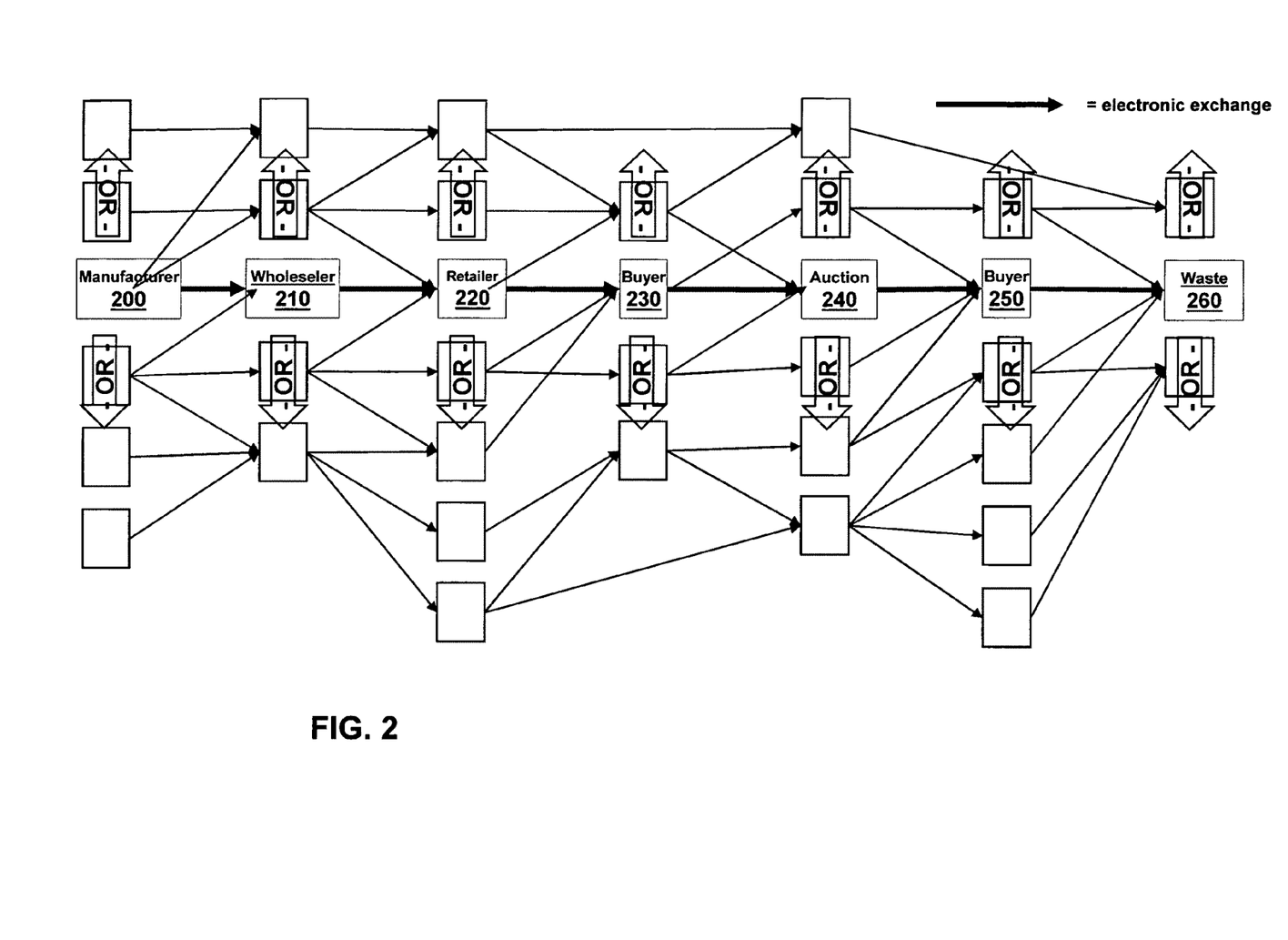
FIG. 2 shows an example supply chain management system according to an embodiment of the present invention.

FIG. 2 shows an example dynamic supply chain according to an embodiment of the present invention. One or more manufacturers $200_1, \ldots 200_n$ may provide goods to one or more wholesalers $210_1 \ldots 210_n$. Likewise, the one or more wholesalers $210_1 \ldots 210_n$ may provide goods to one or more retailers/bookstores $220_1 \ldots 220_n$. The one or more retailers $220_1 \ldots 220_n$ may sell such goods to one or more buyers $230_1 \ldots 230_n$. The one or more buyers $230_1 \ldots 230_n$ may resell such goods via one or more auctions $240_1 \ldots 240_n$ to one or more buyers $250_1 \ldots 250_n$. Eventually, the goods are consumed or disposed of as one or more waste management solutions $260_1 \ldots 260n$. In this case of potentially multiple partners, vendors, suppliers, and customers, a common understanding of the semantics through the complete supply chain is useful. Similar to the supply chain model, other embodiments of the present invention are extendable to other business models including the entire lifecycle of a product, system, process, and the like.

Figure 3:
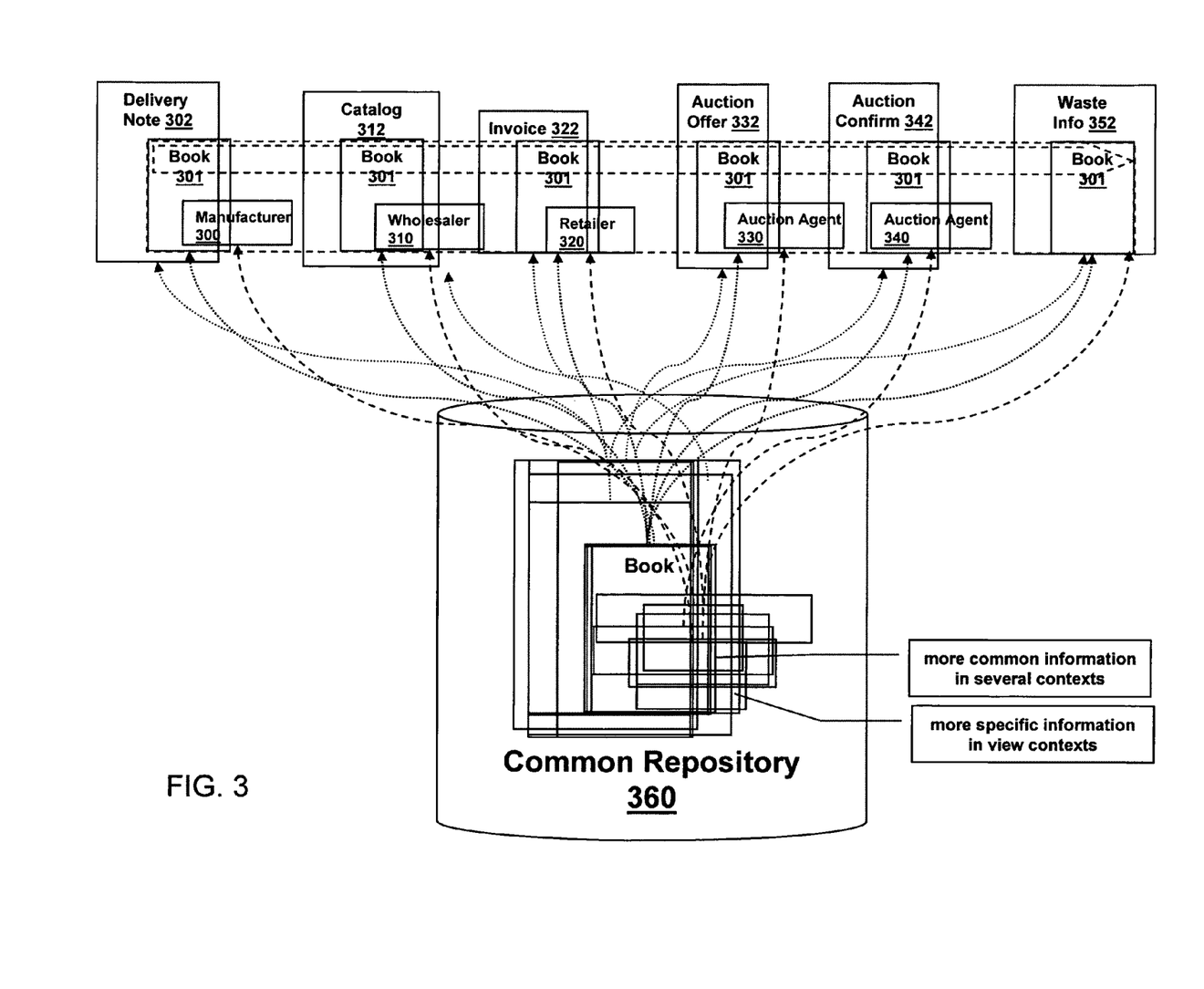
FIG. 3 shows an example supply chain management system involving a common repository according to an embodiment of the present invention.

FIG. 3 shows a supply chain management model with respect to a context specific message exchange of the same object and having a common repository according to the present invention. The common repository provides business content which is accessible to everyone in the supply chain and outside of the supply chain. Further, the business content may be modified/adjusted to include current information. Further, the business content in the repository is based on the same business semantic language. Further, the repository includes business context in which all context specific parts and the overall view are categorized. In an embodiment of the present invention, a user is able to access the repository using a local business browser.

In FIG. 3, the manufacturer 300 has a good/product 301, e.g., a book, for which there is an associated delivery note 302 for transmission to a wholesaler 310. Information regarding the good/product 301 and the associated delivery note 302 are included in the common repository 360. The wholesaler 310 receives the good/product 301 and catalogues 312 the good/product 301. The cataloguing of the good/product 301 may be included in the common repository 360. The wholesaler 310 then transfers the product/good 301 to the retailer/bookstore 320. The retailer 320 receives the good/product 301 and prepares an associated invoice 322 for the good/product 301 sale to a customer. The invoice 322 may be included in the common repository 360. The retailer 320 may auction the good/product 301 via an agent 330. The auction offer 332 may be included in the common repository. If the auction offer 332 is accepted by a customer, then an auction confirmation 342 of the sale of the good/product 301 is provided by the auction agent 330 or other associated agent 340. The auction confirmation 342 may be stored in the common repository 360. Eventually, the good/product 301 is consumed/disposed of as waste 350. The associated waste information 352 may be provided to the common repository 360.

The common repository 360 may store each of the various context specific items, and/or may provide context specific information for population of and preparation of any of the various context specific items. The context specific items include, for example, the delivery note 302, the catalogue 312, the invoice 322, the auction offer 332, the auction confirmation 342, and the waste information 352. The common repository 360 may include more common information in several contexts, and/or more specific information in view contexts. The common repository 360 may be based on one business semantic language allowing for ease-of-use during the supply chain model implementation.

Figure 4:
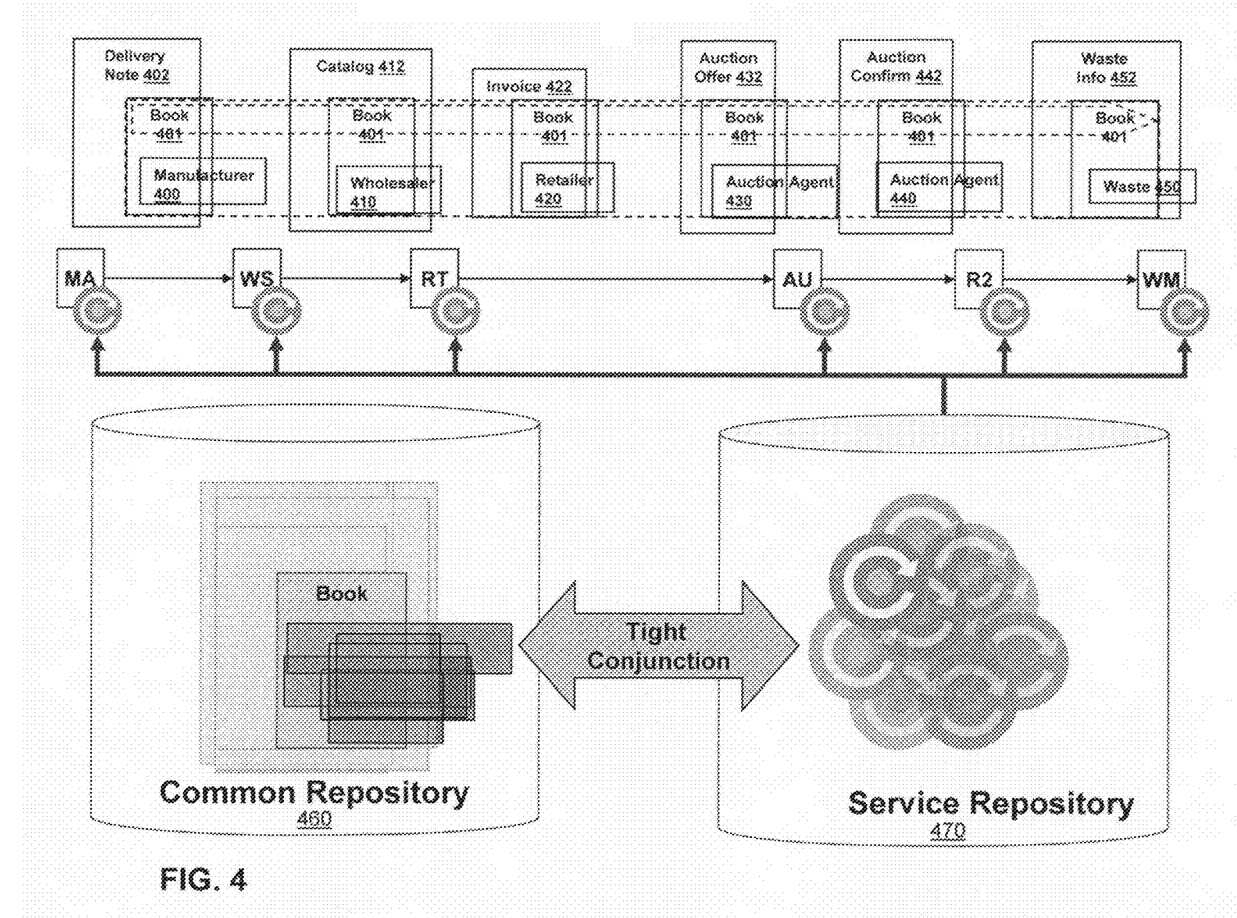
FIG. 4 shows an example supply chain management system involving a service repository according to an embodiment of the present invention.

FIG. 4 shows a supply chain management model with respect to services and having a common repository and service repository according to the present invention. In embodiments, the common repository 460 is a context specific service enabling available to users. At the same time, the common repository also may provide access to business information which is not context specific service enabling, as shown in FIG. 3. The common repository 460 may work in tight conjunction with a service repository 470. The service repository 470 may maintain the various service processes and the like. The common repository 460 and the service repository 470 may serve as an overall-appearing single business information repository.

In FIG. 4, the manufacturer 400 has a good/product 401, e.g., a book, for which there is an associated delivery note 402 for transmission to a wholesaler 410. The wholesaler 410 receives the good/product 401 and catalogues 412 the good/product 401. The wholesaler 410 then transfers the product/good 401 to the retailer/bookstore 420. The retailer 420 receives the good/product 401 and prepares an associated invoice 422 for the good/product 401 sale to a customer. The retailer 420 may auction the good/product 401 via an agent 430. If the auction offer 432 is accepted by a customer, then an auction confirmation 442 of the sale of the good/product 401 is provided by the auction agent 430 or other associated agent 440. Eventually, the good/product 401 is consumed/disposed of as waste 450. The associated waste information 452 may be provided to the common repository 460.

The common repository 460 may store each of the various context specific items, and/or may provide context specific information for population of and preparation of any of the various context specific items. The context specific items include, for example, the delivery note 402, the catalogue 412, the invoice 422, the auction offer 432, the auction confirmation 442, and the waste information 452. The common repository 460 may include more common information in several contexts, and/or more specific information in view contexts. The common repository 460 may be based on one business semantic language allowing for ease-of-use during the supply chain model implementation.

In addition, the common repository 460 (may exist alone or) may work in conjunction with a second repository/repositories 470 to store services and/or context specific service enabling information.

Figure 5A:
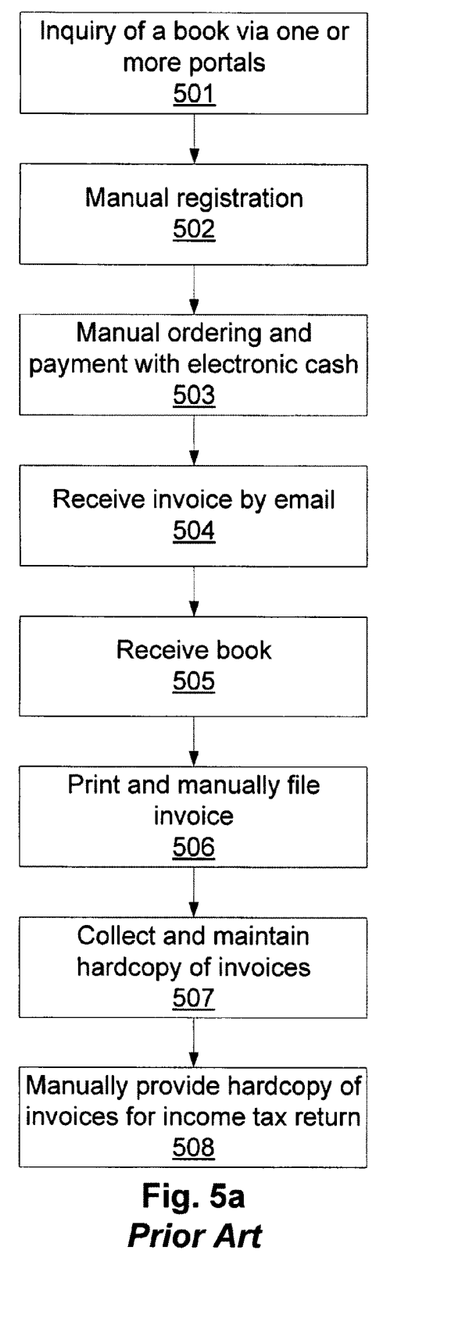
FIG. 5a shows an example flowchart of a use case.

FIG. 5a shows an example flowchart illustrating a use case for buying a product such as a book. In step 501, a potential customer may search or inquire about a product, e.g., a book, from one, or more likely several, online portals. Such online portals are each individual portals and require separate searches from each other. These separate searches may each require a different context or expression in order to find the desired book/product. Such online portals, e.g., book-providing store websites, are more likely include those companies whose marketing campaigns are stronger or more visible than the average small business with a seemingly small, if any, presence on the Internet. Certain web browsers may show only those portal options which have bought advertisement space or submitted enough metadata to capture any search inquiry. In step 502, once a potential customer finds the desired book at one of the online portals, then the potential customer must register manually with that online portal in order to buy the book. This manual registration is necessary for first-time customers of the specific portal. Some available portals provide an option for storing a customer's information for future purchases. In step 503, a customer must manually order and pay using electronic cash for the book purchase. The customer must enter payment information, e.g., credit card information or other electronic payment service information. Some portals allow for payment via telephone and/or first class mail and/or facsimile. In those cases, an additional manual step of providing payment is required. In step 504, the customer receives the invoice by email into a separate mail system. For example, upon purchase of a book from an online portal, the online portal will email a copy of the invoice to the customer. The customer must then enter into its email provider system to obtain the invoice copy for its records. In step 505, the book is transported manually to and received by the customer. In step 506, the customer may wish to print the invoice received by email and file it in a paper file, and/or as a separate file on the customer's computer harddrive or computer-readable medium. In step 507, the customer may wish to maintain the printouts of all invoices in a binder, or as a folder of separate files on the computer. In step 508, the customer may need to provide the hardcopy of the invoices for an income tax return. This requires that the customer remained diligent in transferring each received invoice via email into a computer or hardcopy file.

Figure 5B:
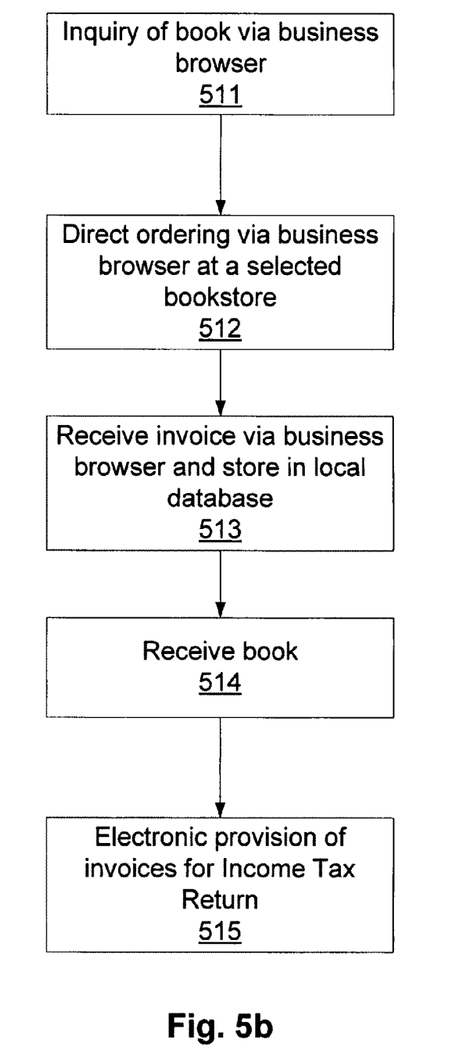
FIG. 5b shows an example flowchart of a use case according to an embodiment of the present invention.

FIG. 5b shows an example flowchart illustrating a use case for buying a product such as a book in accordance with the present invention. In step 511, a potential customer inquires about a product/good via the business browser of an embodiment of the present invention. The business browser considers all book-providing stores having a presence in the embodiment. And, the business browser provides all results having the desired book to the potential customer. Further, the business browser may provide such results without regard to the size/popularity of the book-providing store. The potential customer does not need to register with each of the book-providing stores. In step 512, the potential customer directly orders the book via the business browser of the embodiment of the present invention at the selected book-providing store. The potential customer may select the book-providing store based on individual criteria such as price, delivery time, guarantees, for example. In a further embodiment of the present invention, the business browser may provide an option for displaying the results in a certain manner (e.g., lowest to highest price, delivery time availability, etc.) and/or may provide the potential customer with a filter option to only show those book-providing locations having a certain quality (e.g., locations having a shipping location in a specific country, all buying options under a specific amount, etc.). In situations today on the Internet, a potential customer conducting a search inquiry may be presented with options which show only the most requested book-providing store locations, and not all book-providing store locations.

Embodiments of the present invention provide a flexible and dynamic supply chain based on the real demands in the marketplace. Embodiments of the present invention obliterate the current "closed B2B" (Business-to-Business) environment which exists for certain products. Instead, in an embodiment of the present invention, all companies/individuals are able to participate and receive equal opportunities in the business-to-business environment provided.

In step 513, a customer receives its invoice (i.e., all invoices) via the business browser and stores same in a local database. The business browser may provide the customer with an option to maintain all invoices for the customer in an accessible database. In step 514, a customer receives the book. In step 515, the business browser may provide the invoices for the income tax return electronically. This step may eliminate the customers need to find the invoices and provide each separate document or electronic file to the income tax location. The service enabling repository of the present invention may work along with the repository to provide services to a user of the system of the present invention. In this example, the customer is provided with an option of services. For example, during an initial inquiry regarding a specific book, additional services may be provided to assist in efficient inquiry. For example, during direct ordering of the book via the business browser of the present invention, additional services may be provided for support of buyer at selection time such as keeping track of certain criteria and analytics, e.g., quality reviews, for the buyer. For example, during receipt of the invoices via the business browser, additional services may be provided including a cost benefit calculation and control, and accounting services. For example, during electronic provision of invoices, additional services for income tax return service and an accounting service to handle the invoice storage and categorization may be provided. These additional services may be available to a user at any time. These additional services may be offered to the customer during a potential inquiry and/or purchase of a product via the business browser.

Figure 6:
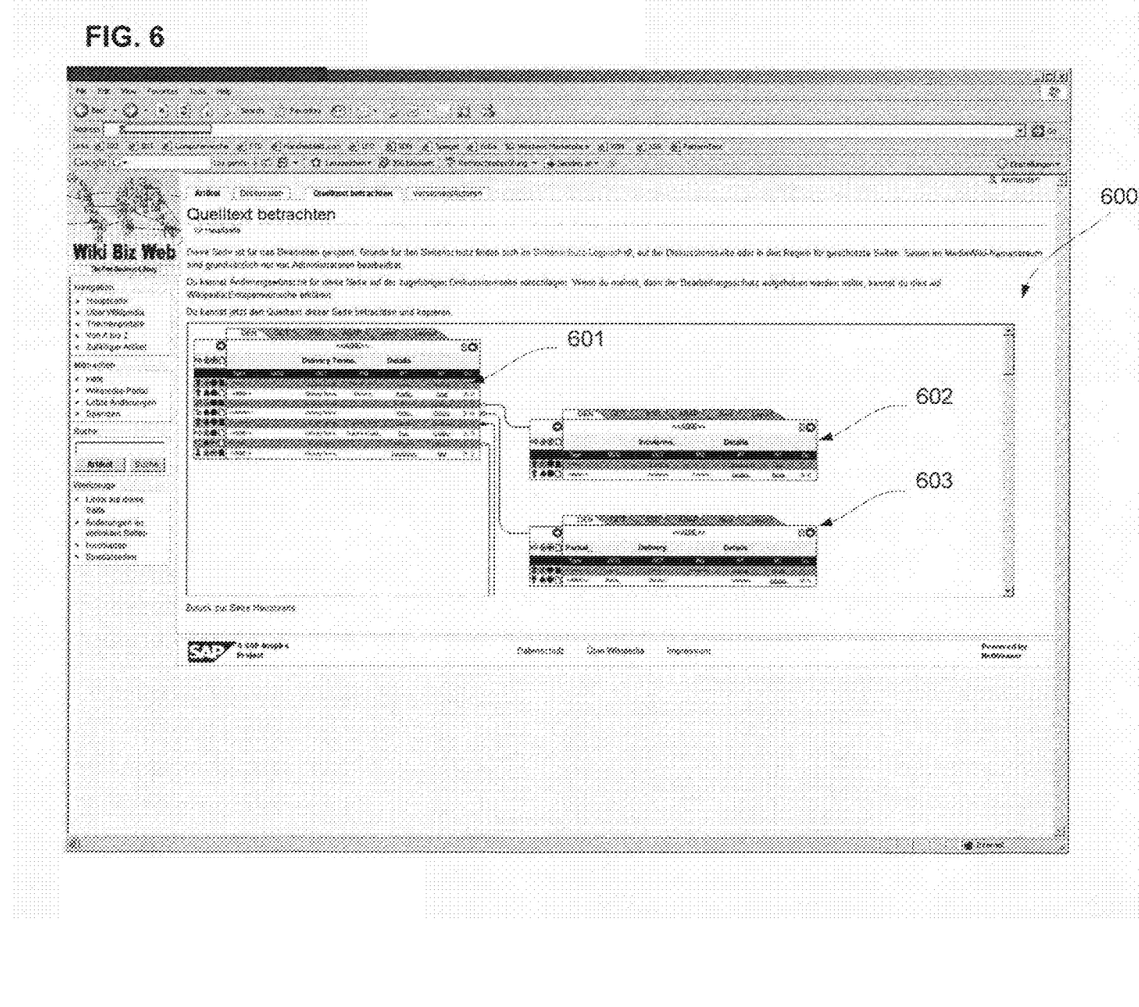
FIG. 6 shows an example screenshot according to an embodiment of the present invention.

FIG. 6 shows an example screenshot 600 of the business browser according to the present invention. A search results table 601 provides a listing of the portals where the requested product has been found. The search results table 601 may indicate a variety of information, including portal identification, delivery times, purchase details, shipping options, and cost. Active links are provided on the search results table 601. If a potential customer clicks on the active link, a second table 602 may be provided which displays the details associated with that link. Likewise, another link click may provide a third table 603 which displays the details associated with that link. The link clicks may also provide a listing of service options available. The details provided by the business browser are obtained via its one or more repositories, as discussed herein, and any additional repositories acting in conjunction with it/them.

Figure 7:
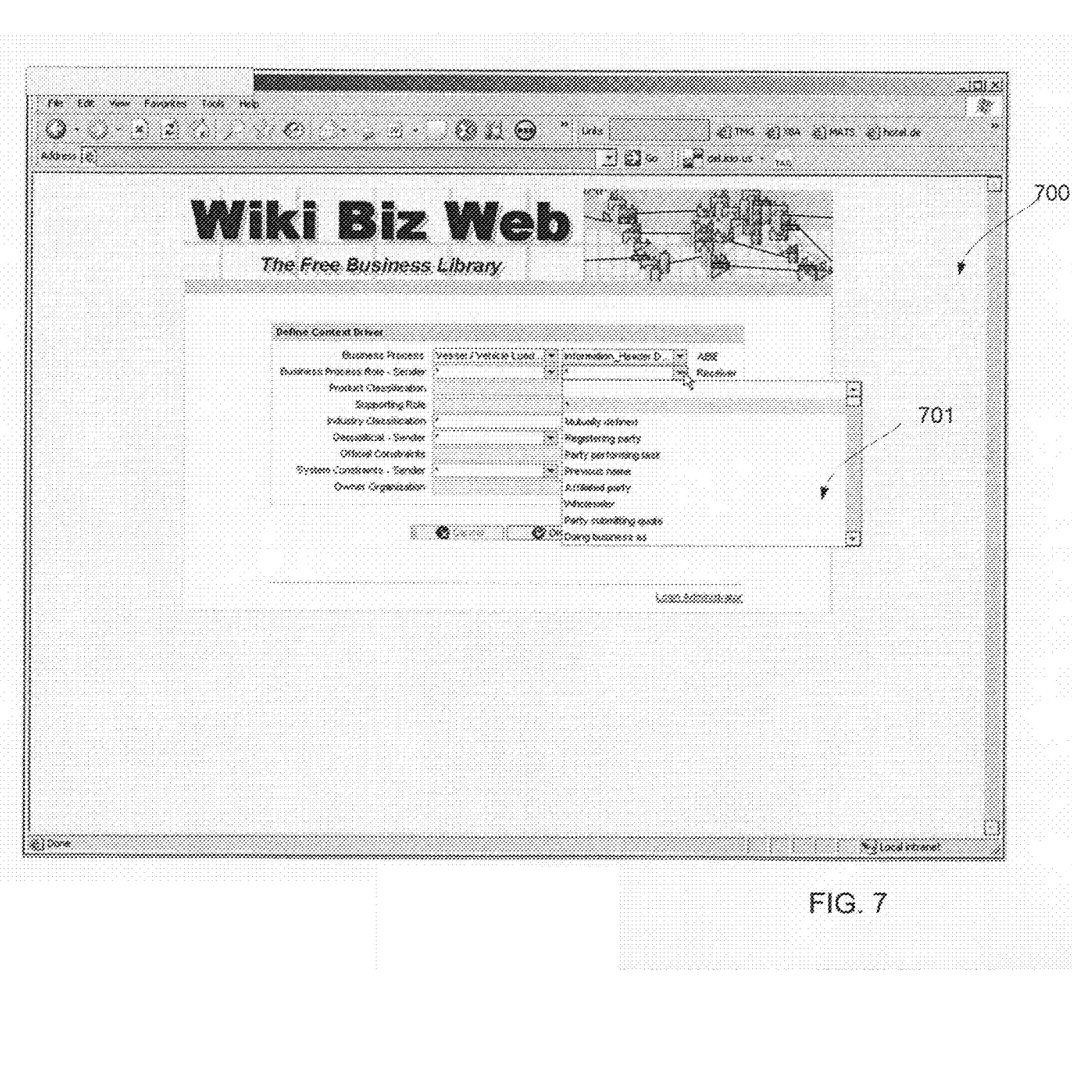
FIG. 7 shows an example screenshot according to an embodiment of the present invention.

FIG. 7 shows an example screenshot 700 of the business browser according to the present invention wherein a common repository is used, and the semantics that describe the business context are commonly defined. The repository can be queried through a lookup table of acronyms or synonyms to achieve an unified clear description. If a potential customer clicks on the pull-down button for receiver, a list of information, including mutually defined, registering party, party information task etc. may be displayed 701.

Figure 8:
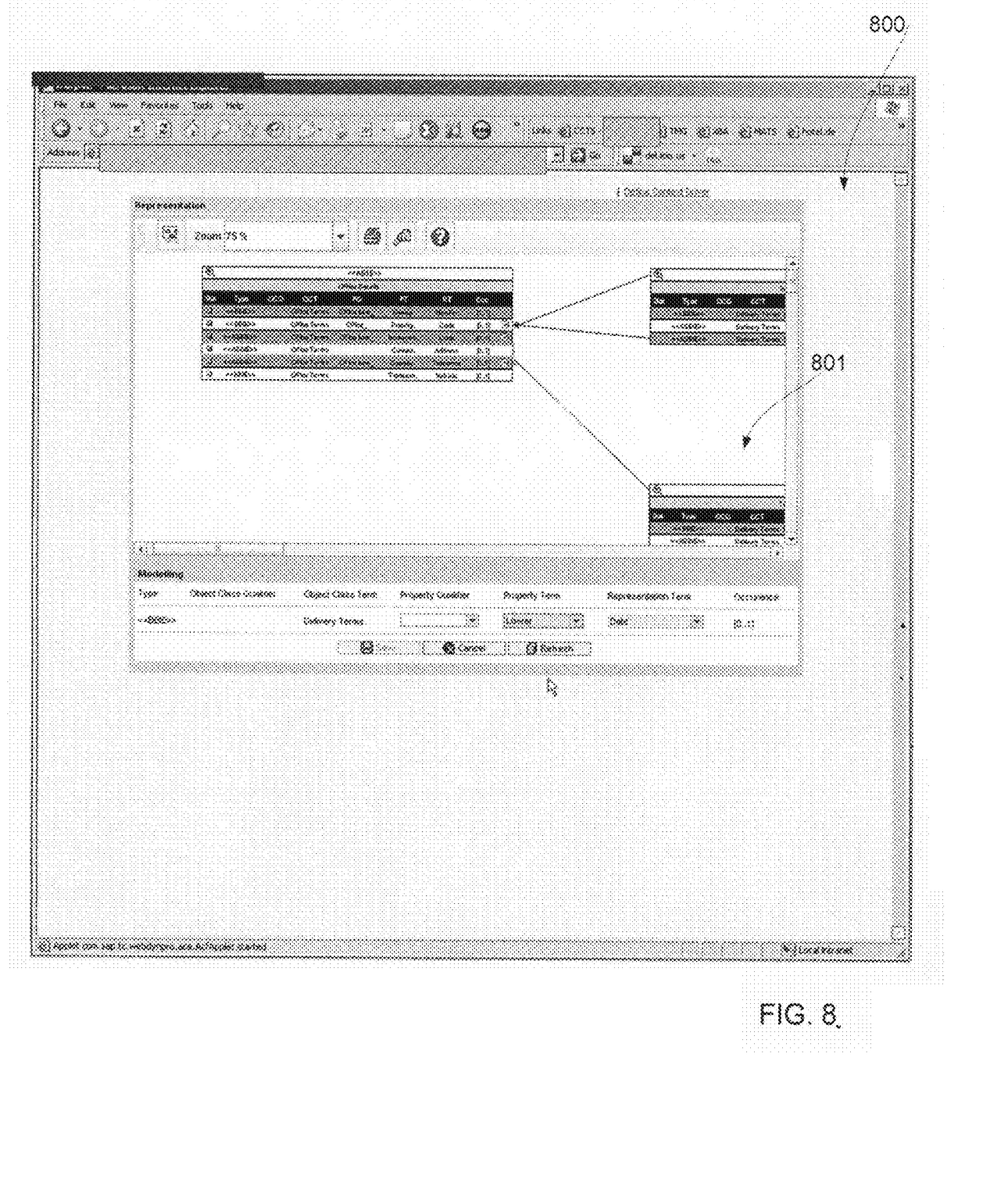
FIG. 8 shows an example screenshot according to an embodiment of the present invention.

FIG. 8 shows an example screenshot 800 of the business browser according to the present invention wherein the electronic business is directly conducted through the business browser. A potential customer and its business partners can check inventory availability and/or conduct collaborative business through the business browser. If a potential customer or its business partner clicks on one of the items, a window 801 with details about the item will pop up.

A user may search for various products and services listings via embodiments of the present invention. For example, electronic business may be conducted directly via the websites of the present invention. Once a user queries for certain products and/or services, options are presented from which a user may select the desired business partner option. Once selecting to conduct business with that business partner option, the user navigates towards purchasing the product and/or service. Accordingly, a user can conduct collaborative business with a business partner upon selection. Further, a user may be able to see what inventory the business partner has available for the queried product and/or service. The query for such matters is done using commonly defined/available business semantics.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A method of using a server for providing an accessible business environment, comprising:

providing a common repository at the server, the common repository being accessible via the Internet and including at least one business portal;

extracting, by a processor on the server, from a plurality of delivery notes from a plurality of manufacturers to respective wholesalers data identifying the delivery note, a product, and a pricing term which is then stored in the common repository of the server;

storing cataloging information about each product in the common repository after the cataloging information is entered by each wholesaler receiving the delivery note;

storing transfer information about each product in the common repository identifying a retailer when the product sold has been transferred from the respective wholesaler to a retailer;

storing retailer pricing information about each product in the common repository after the product has been transferred to the respective retailer;

searching for a product listing in the common repository using a browser;

identifying matching products in the common repository by comparing, by the processor on the server, data stored in the common repository to the search;

receiving the resulting matching product listing indicating at least one of any available business portals and no available business portals, for each matching product, presenting product information identifying the matching product, the retailer pricing information for the matching product, and the retailer selling the matching product;

after receiving an order from a buyer for a matching product:

automatically generating an invoice for the order identifying the selected matching product, the retailer pricing information for the selected matching product, and the retailer selling the selected matching product;

automatically sending the invoice to a computing system of the retailer and a computing system of the entity ordering the selected matching product to finalize the sale; and updating data in the common repository to include the order, the selected matching product, the retailer pricing information for the selected matching product, and the retailer selling the selected matching product and after receiving a request from the buyer to dispose of the selected matching product:

determining, by the processor, at least one waste management solution authorized by the manufacturer for the selected matching product by:

first identifying the order and the retailer selling the selected matching product from the updated data in the common repository, then identifying the wholesaler of the selected matching product from the transfer information in the common repository corresponding to the matching product and the retailer, then identifying the manufacturer of the selected matching product from the delivery note data in the common repository corresponding to the selected matching product and the wholesaler; and updating data in the common repository to indicate that the selected matching product has been disposed according to a selected waste management solution from the at least one waste management solution.

2. The method of claim 1, wherein the common repository includes more than one database.

3. The method of claim 1, wherein the common repository is at least one of searchable and modifiable by any user.

4. The method of claim 3, wherein the common repository includes business context information concerning the at least one business portal.

5. The method of claim 3, wherein the at least one business portal links to the searched matching product listing and provides the product as available for sale.

6. The method of claim 5 further comprising:
selecting one of the at least one business portal links; and
purchasing the selected matching product directly through the selected at least one business portal link provided by the repository.

7. The method of claim 1, wherein the matching product listing includes at least one of shipping options, shipping date availability, product price, inventory available, seller location and acceptable payment type.

8. The method of claim 1, wherein a service enabling repository is connected to the common repository, the service enabling repository including at least one service available to any user of the common repository.

9. The method of claim 8, wherein the at least one service includes an accounting service, an invoice maintenance service, a storage service, a personal payment information storage service, an efficient inquiring service, a selection support service for buyers, a cost benefit analysis service, an income tax filing service, and an indexing service.

10. The method of claim 8, wherein the at least one service includes an accounting service to interface with each of the different accounting systems.

11. The method of claim 8, wherein the at least one service includes an invoice maintenance service to categorize the invoices sent to the account systems of the retailer and entity.

12. The method of claim 1, wherein the common repository includes business context information specifying a unique set of terms, each term identifying one specific item.

13. The method of claim 1, further comprising automatically sending income tax return data for the order based on the pricing term in the delivery note, the cataloging information, the transfer information, and the retailer pricing information to the accounting systems of the retailer and the entity ordering the product after receiving the order for the matching product.

14. A business environment system, comprising:
a server comprising a common repository, the common repository being accessible via the Internet, and including content described in a predetermined manner, the predetermined manner being use of a unique set of terms, each term identifying one specific item, the content including at least one of a business portal and a business information, the server operative to:
extract from a plurality of delivery notes, sent from a plurality of manufacturers to respective wholesalers, data identifying the delivery note, a product, and a pricing term which is then stored in the common repository;
store cataloging information about each product in the common repository after the cataloging information is entered by each wholesaler receiving the delivery note;
store transfer information about each product in the common repository identifying a retailer when the product sold has been transferred from the respective wholesaler to a retailer;
store retailer pricing information about each product in the common repository after the product has been transferred to the respective retailer;
responsive to searching for a product listing in the common repository using a browser, identify matching products in the common repository by comparing data stored in the common repository to the search;
for each matching product, present product information identifying the matching product, the retailer pricing information for the matching product, and the retailer selling the matching product;
after receiving an order from a buyer for a matching product:
automatically generate an invoice for the order identifying the selected matching product, the retailer pricing information for the selected matching product, and the retailer selling the selected matching product;
automatically send the invoice to a computing system of the retailer and a computing system of the entity ordering the selected matching product to finalize the sale; and
update data in the common repository to include the order, the selected matching product, the retailer pricing information for the selected matching product, and the retailer selling the selected matching product; and
after receiving a request from the buyer to dispose of the selected matching product:
determining at least one waste management solution authorized by the manufacturer for the selected matching product by:
first identifying the order and the retailer selling the selected matching product from the updated data in the common repository, then identifying the wholesaler of the selected matching product from the transfer information in the common repository corresponding to the matching product and the retailer, then identifying the manufacturer of the selected matching product from the delivery note data in the common repository corresponding to the selected matching product and the wholesaler; and
updating data in the common repository to indicate that the selected matching product has been disposed according to a selected waste management solution from the at least one waste management solution; and
a browser for searching the common repository,
wherein the browser is utilized to search for at least one product identified in the common repository.

15. A computer-readable medium including instructions that when executed on a processor, perform a method for providing an accessible business environment, the method comprising:
providing a common repository at the server, the common repository being accessible via the Internet and including at least one business portal;
extracting from a plurality of delivery notes from a plurality of manufacturers to respective wholesalers data identifying the delivery note, a product, and a pricing term which is then stored in the common repository of the server;

storing cataloging information about each product in the common repository after the cataloging information is entered by each wholesaler receiving the delivery note;

storing transfer information about each product in the common repository identifying a retailer when the product sold has been transferred from the respective wholesaler to a retailer;

storing retailer pricing information about each product in the common repository after the product has been transferred to the respective retailer;

searching for a product listing in the common repository using a browser;

identifying matching products in the common repository by comparing data stored in the common repository to the search;

receiving the resulting matching product listing indicating at least one of any available business portals and no available business portals, for each matching product, presenting product information identifying the matching product, the retailer pricing information for the matching product, and the retailer selling the matching product;

after receiving an order from a buyer for a matching product:

automatically generating an invoice for the order identifying the selected matching product, the retailer pricing information for the selected matching product, and the retailer selling the selected matching product;

automatically sending the invoice to a computing system of the retailer and a computing system of the entity ordering the selected matching product to finalize the sale; and updating data in the common repository to include the order, the selected matching product, the retailer pricing information for the selected matching product, and the retailer selling the selected matching product and after receiving a request from the buyer to dispose of the selected matching product:

determining at least one waste management solution authorized by the manufacturer for the selected matching product by:

first identifying the order and the retailer selling the selected matching product from the updated data in the common repository, then identifying the wholesaler of the selected matching product from the transfer information in the common repository corresponding to the matching product and the retailer, then identifying the manufacturer of the selected matching product from the delivery note data in the common repository corresponding to the selected matching product and the wholesaler; and updating data in the common repository to indicate that the selected matching product has been disposed according to a selected waste management solution from the at least one waste management solution.

\* \* \* \* \*